INVENTOR.
JOSEPH J. CIOCHETTO

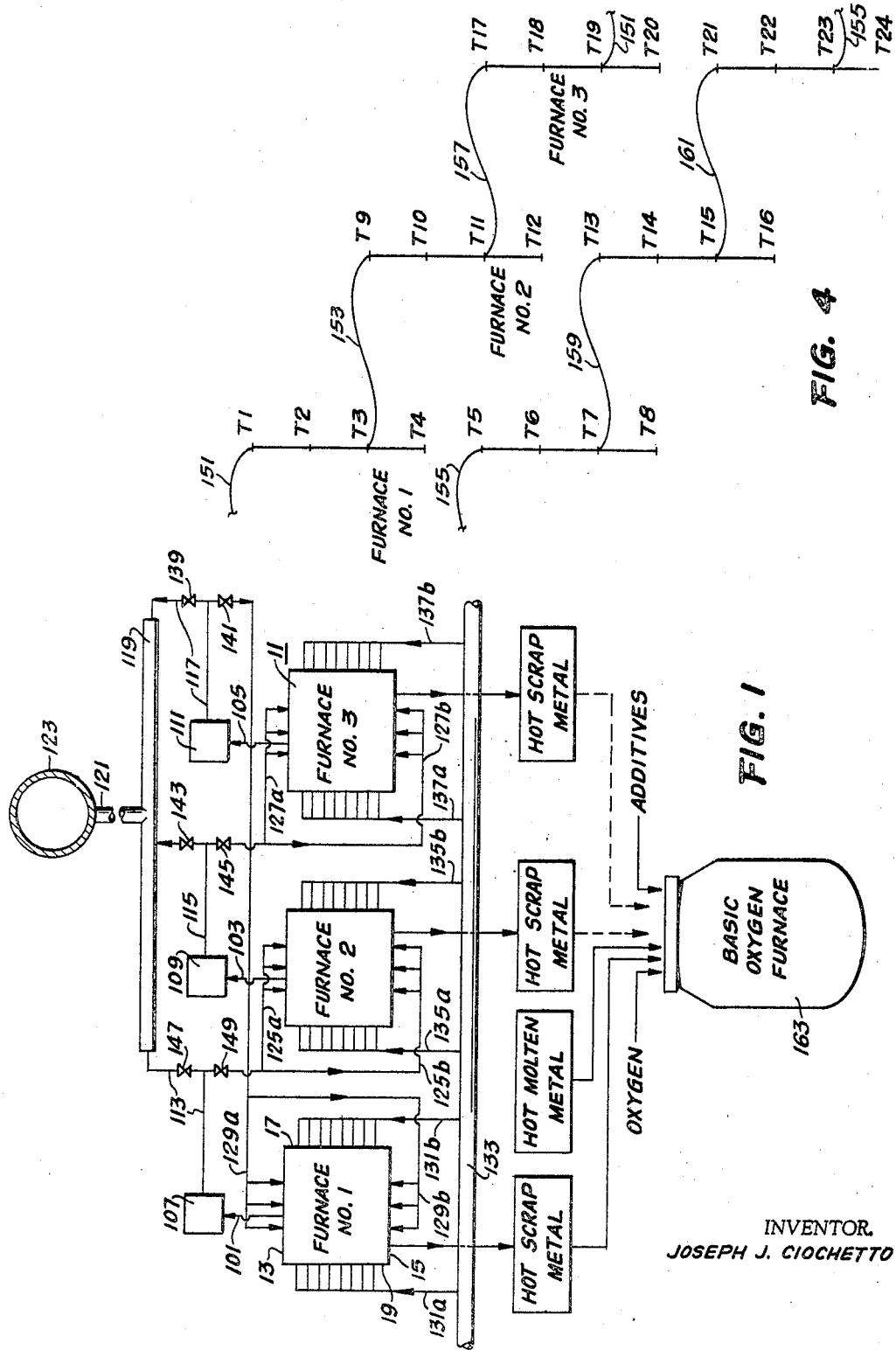

United States Patent Office 3,480,266
Patented Nov. 25, 1969

3,480,266
APPARATUS FOR MAKING STEEL
Joseph J. Ciochetto, Glenshaw, Pa., assignor to Koppers Company, Inc., a corporation of Delaware
Original application Apr. 16, 1965, Ser. No. 448,715, now Patent No. 3,399,992. Divided and this application Oct. 27, 1967, Ser. No. 705,240
Int. Cl. F27b 5/12, 5/16
U.S. Cl. 266—27  3 Claims

ABSTRACT OF THE DISCLOSURE

A plurality of scrap metal preheating furnaces are operated in sequence to provide an uninterrupted supply of preheated scrap metal to a basic oxygen furnace. The exhaust gases produced in one preheater are conducted to and partially heat cold scrap metal in another preheater; the remaining heat required being supplied by burning suitable fuel in the preheater under operation during a given period of time.

---

This is a division of application Ser. No. 448,715, filed Apr. 16, 1965, now Patent No. 3,399,992.

This invention relates to steelmaking and more particularly to scrap metal preheating apparatus for use in making steel and the method of operation of such apparatus.

A basic oxygen converter such as is used for making steel is generally a cylindrical vessel which is closed at one end and open at the other end and which is rotated about a horizontal axis for charging with raw materials and for unloading the steel produced therein. Within the vessel, oxygen of high purity is directed onto or into the surface of molten metal to oxidize impurities in the hot metal and to produce steel.

The initial charge of raw materials in the basic oxygen converter usually includes hot molten metal produced in a reduction furnace, additives such as burnt lime, and a quantity of relatively cold scrap metal. Usually the scrap metal is not preheated, and during the latter stages of the process cold scrap metal is frequently introduced into the vessel, along with other ingredients, as a means for controlling the temperature of the melt.

Heretofore, the scrap has been usually removed from a storage area, loaded into scrap charging boxes, weighed, and then transported to the furnace region. The furnace vessel, containing molten metal, is usually tilted about its horizontal axis at some convenient angle and the scrap is then charged into the furnace. It is evident that the introduction of relatively cold scrap into a molten bath in a basic oxygen furnace can radially change the heat balance to such an extent that considerably more oxygen must be consumed to reduce the metal to steel during the oxygen blow period.

According to the present invention, scrap metal is heated in either one or a series of interrelated scrap preheater apparatus. Scrap metal in a first preheated apparatus is preheated initially by waste gases produced in second already heated preheater apparatus. Thereafter, the scrap in the first preheater is heated further burning a fuel therein to raise the temperaurte of the scrap metal to a desirable value.

The preheater apparatus of the present invention includes a rectangular box-like container having a pair of hinged upwardly sloping leaves forming a top closure and opposed side walls a portion of each of which is hinged and outwardly movable away from the bottom of the preheater. The end walls are fixed and project beyond the side walls, so as to cover the edges of the hinged walls when they are in the open position. The interior of the preheater includes a raised bottom structure covering an exhaust gas conduit for escaping exhaust gases.

According to the present invention scrap metal is removed from the conventional storage area in the usual manner; it is loaded into scrap charging boxes, weighed, and then, before it is charged into the basic oxygen converter, it is placed in a scrap preheater apparatus wherein it is heated to a desirable temperature of about 1500–1500° F. Gas, oil, or any other suitable heating fuel may be burned to raise the temperature of the scrap. The heat from the burning fuel is introduced into the preheater preferably above the level of scrap metal and is exhausted preferably below the bottom level of the scrap metal. In this manner, a more uniform heat distribution throughout the scrap metal is achieved. When the scrap metal has reached a temperature of about 1400–1500° F., the hinged portion of one of the side walls is pivoted outwardly from the bottom in a controlled manner, and the scrap in that side of the furnace discharges into a scrap charging box which has been placed advantageously below the preheater.

Scrap metal which has been preheated to between 1400–1500° F. in a preheater of the present invention will not appreciably disturb the heat balance when such scrap is introduced into the molten metal in a basic oxygen furnace. Consequently, a considerably smaller quantity of oxygen will be required to produce steel during the oxygen blow period when compared with the oxygen used when cold scrap is introduced, as is customary.

For a further understanding of the present invention and for features and advantages thereof, reference may be made to the following description taken in conjunction with the accompanying drawings which show for the purpose of exemplification a preferred embodiment of the invention.

In the drawings:

FIG. 1 is a schematic arrangement of apparatus for making steel including a plurality of scrap preheater apparatus in accordance with the present invention;

FIG. 4 is a schematic operational diagram of the preheaters of FIG. 1.

Figure 2:
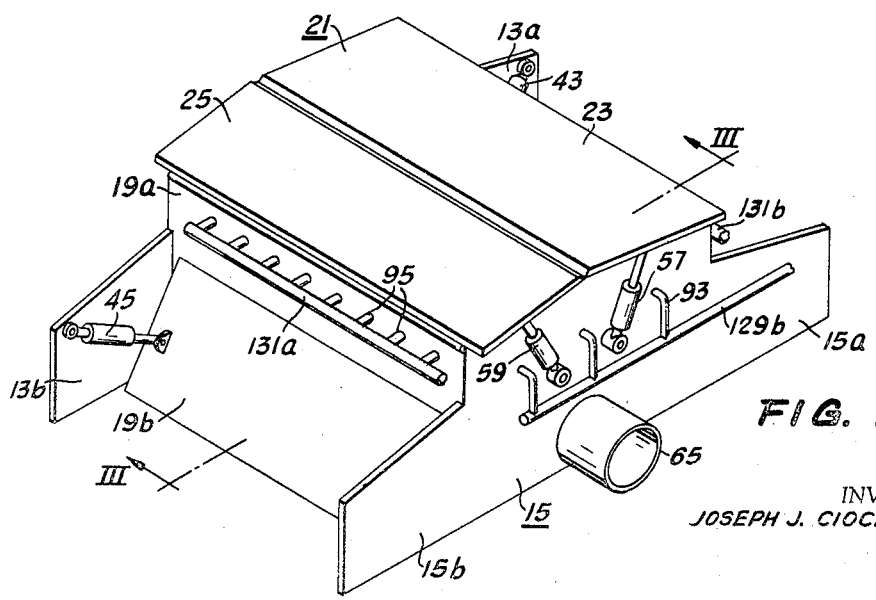
FIG. 2 is a schematic perspective view of a typical one of the preheater appaartus of FIG. 1.

In FIG. 2 there is shown a scrap preheater apparatus 11 which includes an enclosure or chamber in the form of a rectangular box-like structure having opposed fixed end walls 13, 15 and opposed partially movable side walls 17, 19. The preheater apparatus 11 is provided with a sloping split roof 21 comprised of a pair of hinged edge abutting leaves 23, 25, and a vaulted structural bottom 27, shown in FIG. 3, which supports a load of scrap metal 29 within the furnace. Of course, the bottom structure 27 may be arched, if preferred, instead of vaulted as shown.

The end walls 13, 15 are generally rectangular, having a gable portion at the top. Each end and side wall comprises a suitable structure such as steel plates 31 and suitable structural members 33 fixed thereto, and to which suitable refractory material 37 such as refractory bricks are secured in the usual manner. Each end wall 13, 15 is also provided with a pair of outwardly extending substantially coplanar wing portions 13a, 13b and 15a, 15b. The end wall coplanar extensions 13a, 13b and 15a, 15b are also comprised of supporting steel plates and suitable structural members which support conventional suitable refractory materials, such as bricks 37, in the usual manner.

Figure 3:
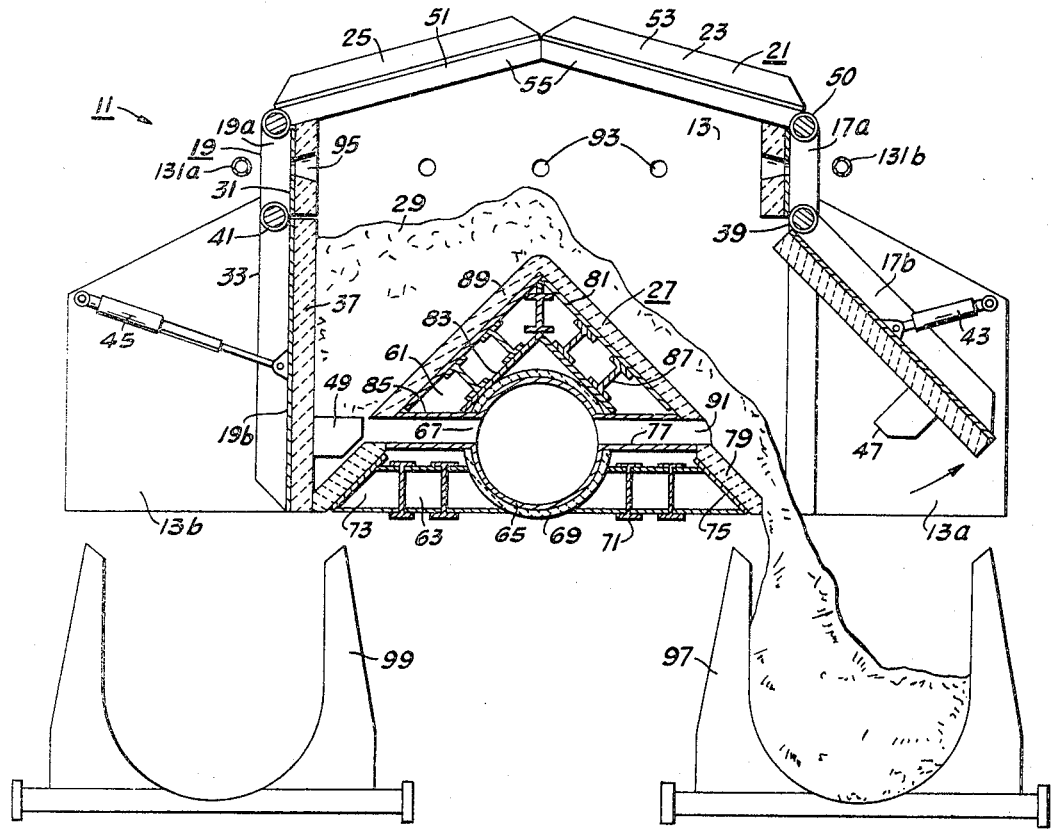
FIG. 3 is a transverse sectional view taken along line III—III of the preheater of FIG. 2.

The side walls 17, 19 have upper fixed portions 17a, 19a respectively, and lower movable portions 17b, 19b, which are suitably hinged, as at 39, 41, to the lower edge of the upper fixed portions. The hinged lower side wall portions 17b, 19b are actuated by conventional hydraulic piston-cylinders 43, 45 which may be conveniently mounted on the side wall extensions 13a, 13b and 15a, 15b, about as shown in FIGS. 2 and 3, or in any other suitable manner.

The hinged lower side wall portions 17b, 19b constitute a gate which, when actuated in the manner described hereinafter, regulate and control the flow of scrap from the preheater. The hinged lower side walls or gates 17b, 19b, may each be a single unit substantially as long as the preheater 11, as shown, or may be comprised of a number of separate pivotable units each of which may be operable individually by means of its own piston-cylinder unit, or by a single piston-cylinder unit operating the several gates in unison. Actuating the several gate portions (when such are utilized) of each wall in sequence has the advantage that only a portion of the scrap in each side of the preheater is discharged at one time through each gate. And so, the impact of the scrap metal in the scrap charging boxes located below the furnace is considerably less than if the entire side wall is actuated at one time and the entire load of scrap metal in one side of the furnace is discharged.

The hinged side walls 17b, 19b are each provided with a plurality of uniformly spaced apart, inwardly extending, substantially horizontal grates 47, 49, respectively. The grates are comprised of a suitable material, preferably Masonite, which is able to withstand high temperatures without a protective covering, such as refractory material.

The roof 21 of the preheater 11 is comprised of a pair of edge abutting leaves 23, 25 which are hinged as at 50, and which, like the side structures, are constructed of steel plates 51 reinforced by suitable structural members 53. The inner surface of the leaves 23, 25 are also covered with a suitable conventional refractory material 55, such as refractory bricks, or the like. As shown in FIG. 2, the leaves 23, 25 are individually actuated by conventional piston-cylinder units 57, 59 respectively, which are preferably mounted on the gable portion of the end walls 13, 15.

As illustrated, an A-frame type of vaulted bottom structure 27 comprises generally an upper portion 61 having a triangular cross-sectional configuration; a lower portion 63 having a trapezoidal cross-sectional configuration; and a cylindrical exhaust gas conduit 65.

The cylindrical exhaust conduit 65 comprises a tube which is disposed generally horizontally and longitudinally through the preheater 11, and which extends beyond the end walls 13, 15 about as shown in FIG. 2, for a convenient distance and for a purpose that will be later described. In the wall of the exhaust conduit 65, there are a plurality of longitudinally arranged exhaust ports 67, and the outer wall of the conduit 65 is covered with an insulating material 69, preferably a conventional castable type insulation.

The lower portion 63 is comprised of a plurality of structural I-beams 71 disposed generally horizontally and longitudinally of the preheater, and a plurality of intercooperative structural I-beams 73 disposed transversely of the preheater, about as shown in FIG. 3. The intercooperative structural I-beams 71, 73 provide a substantial support structure for the weight of scrap material introduced into the preheater.

Sloping plates 75 are provided along the sides of the lower portion 63, and horizontal plates 77 are provided along the top of the lower portion. The sloping side plates 75 are, like the side and end walls 17, 19 and 13, 15, protected from heat in the preheater by suitable refractory material 79, such as refractory bricks or the like.

The upper portion 61 is comprised of upwardly sloping spaced apart parallel inner and outer plates 81, 83 respectively; horizontal transverse plates 85 which are spaced apart from and generally parallel to the top plates 77; and a plurality of longitudinally disposed I-beam structural members 87 connected to both the inner and outer plates 81, 83 respectively. The side plates 81, 83 are generally parallel to the sloping side plates 75 of the bottom portion, and are likewise protected from heat in the preheater by suitable refractory material 89, such as refractory bricks or the like.

While not illustrated, the upper and lower portions 61, 63 respectively, are interconnected at several locations throughout the length of the preheater to provide structural continuity between the upper and lower portions 61, 63. Thus, there are formed a plurality of transversely disposed individual passages or conduits between the bottom plates 85 and the top plates 77 which serve as exhaust gas ducts 91. Each exhaust gas duct 91 communicates at one end with the preheater interior adjacent the grates 49, and at the other end with the exhaust gas conduit 65 at one or more of the ports 67.

Preheater apparatus 11 may be charged with a load of scrap metal by first pivoting the hinged roof leaves 23, 25 to an open position (not shown) and then depositing scrap metal in the preheater. The scrap metal may be handled in any convenient manner, such as by using conventional electromagnetic apparatus, or clam shell type charging buckets, and like apparatus. The scrap metal will segregate into two portions within the preheater, each being on opposite sides of the longitudinal central plane through the apex of the intersecting side plates 81. The top of the scrap metal should normally be at a level just below the level of the ports 93, 95 in the end walls and side walls respectively.

After the preheater 11 has been charged with scrap metal until it reaches the preferred level, as indicated generally in FIG. 3, the roof 21 may be closed and the preheater apparatus 11 heated. The preheater 11 may be operated either as a single unit, or as one of a group of preheaters arranged about as shown in FIG. 1. It should be understood that each of the preheaters Nos. 1, 2 and 3, as shown in FIG. 1, is similar to the preheater apparatus 11 described herein.

In the operation of preheater 11 as a single unit, it is charged with scrap metal to a level substantially as shown in FIG. 3. Thereafter, fuel is ignited at the burners (not shown) in ports 95. The heat generated in the preheater raises the temperature of the scrap metal and, because a lower pressure exists in the exhaust duct 65, the exhaust gases flow downward through the scrap metal. A lower pressure exists in the exhaust duct 91 by virtue of the exhaust arrangement described hereinafter. After permeating the load of scrap metal the exhaust gases emerge from the preheater via the exhaust passages 91. The gases then enter the exhaust gas conduit 65 and are led to a suitable exhaust stack, or may be disposed of in some other appropriate manner.

When the scrap has been heated to a preselected temperature, usually about 1450° F., a pair of conventional scrap charging boxes 97, 99 are positioned below the preheater 11 at a location about as shown in FIG. 3. Such scrap charging boxes are preferably mobile so as to be readily positionable in preselected locations.

When the scrap metal is ready to be discharged, the piston-cylinder 43 is actuated to pivot the hinged side wall 17b, if the wall is made as a single member, or the first of a group of separately hinged wall members constituting the side wall 17, as mentioned hereinbefore. The heated scrap metal then gravitates into the scrap charging box 97.

In like manner, the pivotable side wall 19b may be actuated by operating the piston-cylinder 45, whereupon the remainder of the scrap metal in the preheater gravitates into the scrap charging box 99.

The scrap preheater 11, as illustrated herein, has several readily apparent features. The sloping split roof is easily operated for quick and convenient charging of the scrap into the preheater, using conventional magnetic or bucket-type loading mechanisms. Then, too, the A-frame type of bottom construction distributes the mass of scrap metal in such a way that it does not become "packed" when loaded; and the largest amount of scrap metal is near the top of the preheater where it is exposed to the greatest heat from the burners in the ports 95. The grates 47, 49 also provide a strong, porous support bed, yet the exhaust gases are not unduly restricted in passing from the preheater into the exhaust gas ducts 91 and conduit 65. Furthermore, as the hinged portion 17b opens, the grates, as for example 47, serve to deflect the falling scrap and direct it back into the downward path and toward the scrap charging box. Thus, the grates prevent the scrap from overshooting the outer sides of the scrap charging box and missing it entirely.

Those skilled in the art will recognize that the A-frame type of bottom structure described herein requires no heavy water cooled members to dissipate heat and to withstand severe impact loads of falling scrap metal. Also, the piston-cylinder mechanisms for actuating the pivotable side walls 17b, 19b, provide a convenient mechanism for either quickly or slowly opening the sides, and controlling the rate of unloading the scrap.

A plurality of preheater apparatus 11, as described herein, may be arranged in a side-by-side manner as a group of such preheaters, designated Nos. 1, 2 and 3 in FIG. 1. In the arrangement shown, the exhaust gases in each preheater pass through respective exhaust gas ducts 91 and enter an exhaust gas conduit 65. Each of the exhaust gas conduits 65 from preheaters Nos. 1, 2 and 3 communicates via suitable outside conduits 101, 103, 105 respectively (see FIG. 1) with the inlet of conventional type of exhaust fans 107, 109, 111. The exhaust fans 107, 109, 111 create the reduced pressure in the exhaust conduit 65 and ducts 91 mentioned previously and draw the exhaust gases from the preheaters. Thereafter, the gases flow via conduits 113, 115, 117 into a common exhaust gas header 119, which communicates via a conduit 121 with an exhaust gas stack 123.

The exhaust fan outlet conduit 113 communicates also via a branched conduit 125a, 125b with the ports 93 in the end walls 13, 15 of preheater No. 2. In like manner, the exhaust fan outlet conduit 115 communicates via a branched conduit 127a, 127b with the ports 93 in the end walls 13, 15 of preheater No. 3. The exhaust fan outlet conduit 117 likewise communicates via a branched conduit 129a, 129b with the ports 93 in the end walls 13, 15 of preheater No. 1.

As mentioned previously, there are a plurality of burner ports 95 in the fixed portion of the side walls 17, 19 (see FIG. 3). In the embodiment illustrated in FIGS. 1 and 2, eight burners in the ports 95 in each side wall are connected to respective branches 131a, 131b of a common fuel line 133 serving all of the preheaters, Nos. 1, 2 and 3. Likewise, the eight burners in each side wall of preheater No. 2 communicate with the common fuel header 133 via branch conduits 135a, 135b; and the burners in preheater No. 3 communicate with the header 133 via branch conduits 137a, 137b.

In operating the group arrangement of preheaters shown in FIG. 1, it may be assumed that one of the preheaters, say preheater No. 3 has been fired initially and its exhaust gases are flowing via the exhaust fan 111 into the conduit 117. A pair of control valves 139, 141 in conduits 117 and 129a respectively (see FIG. 1) are operable to control the flow of exhaust gases. Control valves 143, 145 are likewise disposed in conduits 115 and 127a respectively and control valves 147, 149 are disposed in conduits 113 and 125a respectively. Then, by closing normally open valve 139 and opening normally closed valve 141, the hot exhaust gases flow from preheater No. 3 via conduits 129a, 129b into preheater No. 1. The hot exhaust gases permeate the load of scrap metal previously loaded therein and are drawn out of preheater No. 1 via conduit 65 by the exhaust fan 107. The gases are discharged into the common heater 119 and eventually reach the exhaust stack 123. Valve 149 is normally closed and valve 147 is normally open at this time.

The flow of hot exhaust gases into preheater No. 1 is indicated schematically in FIG. 4 by a directional line 151. The vertical line at the left of FIG. 4 is a time schedule of the operation of preheater No. 1, and the marks on the vertical line indicate particular moments of time as for example T–1, T–2, T–3, etc. The other vertical lines in FIG. 4 represent a time schedule of operations of preheater No. 2 and preheater No. 3.

When the exhaust gases from preheater No. 3 first enter preheater No. 1, it commences to preheat the scrap in preheater No. 1. The start of preheating in preheater No. 1, as shown in FIG. 4, is the mark designating time T–1. Preheating of the scrap is maintained for a prearranged time interval between T–1 and T–2. At T–2, the fuel in the 16 burners of preheater No. 1 is ignited, by any suitable means, and preheater No. 1 is then fired for the period of time between T–2 and T–4. At T–2, when the burners in the preheater No. 1 are ignited, the valve 141 is closed and valve 139 is again opened; thus allowing the heat exhausting from preheater No. 3 to escape via the conduits 119, 121 into the exhaust stack 123 and thence to the atmosphere.

When the burners in preheater No. 1 are ignited, valve 141 is closed end valve 139 is again opened. The heating cycle in preheater No. 3 is completed and exhausting is no longer necessary unless an extended time of heating is necessary to maintain the scrap metal at a desired temperature due to an unavoidable delay in the steelmaking cycle.

During the first part of the firing period of preheater No. 1, (from T–2 to T–3) valve 149 is closed (normal position) and valve 147 is open (normal position). Consequently, the heat exhausted by the fan 107 is conveyed to the atmosphere via the stack 123. At a preselected time, T–3, valve 149 is first opened and then valve 147 is closed; whereupon, the exhaust gases from preheater No. 1 flow via conduits 125a, 125b into preheater No. 2. This is shown schematically in FIG. 4 by a directional line 155. The scrap previously charged into preheater No. 2 then commences to preheat at T–9. This corresponds to the initial preheat of the scrap in preheater No. 1 at T–1.

During the time interval T–2 to T–4, the scrap metal in preheater No. 1 increases in temperature, and at T–4 it is ready to be discharged from the preheater into previously located scrap charging boxes 97, 99 (see FIG. 3). The discharge of scrap and the reloading of preheater No. 1 occurs during the time interval T–4 to T–5.

At T–5 hot exhaust gases from a previously discharged, reloaded and fired preheater, such as preheater No. 3, are again directed into preheater No. 1, as indicated by a directional line 155, to preheat a new load of scrap in preheater No. 1. The introduction of the hot gases from preheater No. 3 into preheater No. 1 at T–5 commences another preheating, firing, and dishcharging cycle in preheater No. 1. These events occur during the time interval, shown in FIG. 4, between T–5 and T–8.

The hot exhaust gases flow from preheater No. 1 into preheater No. 2 during the time interval T–9 to T–10, and preheat the scrap in preheater No. 2. At T–10, valve 149 is again closed and valve 147 is again opened. At the same time, fuel which is fed to the 16 burners in preheater No. 2 is fired, and the scrap therein is heated to a desirable temperature during the interval of time between T–10 and T–12.

During the firing of preheater No. 2, at a preselected moment T–11, valve 145 is opened and valve 143 is closed so that the exhaust gases flowing from preheater No. 2 now enter preheater No. 3 via conduits 127a, 127b and commence preheating scrap metal newly loaded thereinto. This is shown in FIG. 4 by a directional line 157. At T–12, the scrap in preheater No. 2 has attained its desired temperature and firing ceases. Valve 143 is again opened. Valve 145 is closed, and the scrap in preheater No. 2 is thereafter discharged into strategically placed scrap charging boxes, as mentioned previously.

During the time interval between T–12 and T–13, preheater No. 2 is discharged and reloaded with scrap. Exhaust gases from preheater No. 1, generated during the time between T–6 and T–8, are again directed (at T–7) into preheater No. 2, as shown by a directional line 159, to commence preheating (at T–13) the newly loaded scrap metal. Thus, another preheating, firing and discharging cycle occurs in preheater No. 2 between T–13 and T–16.

At T–15, valve 145 is opened, valve 143 is closed and heat from preheater No. 2 flows via conduits 127a, 127b into preheater No. 3. This is indicated diagramatically in FIG. 4 by a directional line 161. The heat flowing into preheater No. 3 (at T–21) commences to preheat a new load of scrap therein, and preheating continues during the time interval T–21 to T–22. At T–22, valve 143 is opened, valve 145 is closed, and fuel in the burners in preheater No. 3 is ignited to commence heating the scrap to its desired temperature; valve 139 being normally open and valve 141 being normally closed. At T–23, valve 141 is opened, valve 139 is closed and the exhaust gases from preheater No. 3 then flow via conduits 129a, 129b into preheater No. 1. This is shown diagramatically in FIG. 4, by a directional line 155.

The foregoing describes the cyclical operation of a group arrangement of three preheaters in accordance with the present invention. It should be apparent to those skilled in the art, that such a cyclical operation may readily be extended to an arrangement having a greater number of preheaters.

FIG. 1 also illustrates schematically the use of the preheated scrap metal in producing steel according to the method of the present invention. The scrap metal, when it discharges from the preheater apparatus, is at a temperature of about 1450–1500° F. It is transported in the scrap charging boxes to a basic oxygen furnace 163 and then dumped thereinto. The basic oxygen furnace has been previously charged with a quantity of molten pig iron. Thereafter, certain additives such as lime, etc. are introduced and oxygen is introduced into the vessel by means of the usual lance (not shown), and the molten metal is converted to steel.

The preheater apparatus 11, of the present invention, and the manner of operating the same as described herein, has numerous features and advantages among which are that the use of waste heat gases to initially preheat the scrap reduces the amount of time and the expense of fuel otherwise burned in the preheater to heat the scrap metal to a temperature of about 1500° F. That scrap metal heated to this temperature does not unduly disturb the heat balance in the basic oxygen furnace is also a feature of the invention, and, consequently, less oxygen is required to produce each heat of steel.

That significant savings in not only fuel and oxygen but also in the time to produce a melt of steel can be realized in the operation of a basic oxygen facility which utilizes the scrap preheat apparatus and method of the present invention should be readily apparent to those skilled in this art. The preheater of the present invention may also be used to preheat various other materials such as pellets for pre-reduction prior to use in blast furnace operations.

I claim:
1. A scrap metal preheater comprising:
a pair of spaced apart end walls;
spaced apart side walls disposed between said end walls and comprised of a fixed portion and a movable portion;
means hingedly connecting said movable side wall portion to said fixed side wall portion;
a top closure including a pair of leaves;
means hingedly connecting said leaves to the fixed portion of said side walls whereby when said leaves are edge abutting, the top of said preheater is closed;
means to pivot said leaves whereby scrap metal can be loaded into said preheater;
grates fixed to the movable portion of said side walls adapted to support a portion of the scrap metal in said preheater;
a bottom comprised of a vaulted upper portion and a cellular lower portion spaced apart therefrom;
means interconnecting said upper and lower bottom positions and forming a plurality of fluid passages in said bottom communicating with the interior of said preheater;
a conduit disposed in said bottom communicating said passages through the walls of said preheater with the exterior thereof;
a plurality of burner ports in at least one wall at substantially the level of the scrap metal in said preheater;
means to introduce hot exhaust gases into said preheater whereby said scrap metal is heated;
means for burning fuel in said preheater;
means to exhaust the products of combination via said passages and conduit after the same have permeated the load of scrap metal and heated it further; and
means to pivot the side walls of said preheater to discharge the scrap metal therefrom.

2. A scrap metal preheater comprising:
spaced apart end walls;
spaced apart side walls disposed between and connected to said end walls and comprised of a fixed portion and a movable portion;
means pivotally connecting the movable portion of said side wall to the fixed portion whereby said movable portion is pivotable about an axis;
a bottom structure;
a conduit in said bottom structure communicating through said walls with the exterior of said preheater;
a plurality of passages in said bottom structure communicating said conduit with the interior of said preheater;
a closure for said preheater adapted for opening whereby scrap metal can be loaded into said preheater;
means to introduce heat into said preheater whereby the scrap metal therein is heated;
means to exhaust said heat from said preheater via said passages and conduit; and
means to pivot the movable side wall portions and discharge the heated scrap metal from said preheater.

3. A scrap metal preheater comprising:
spaced apart end walls;
spaced apart side walls disposed between and connected to said end walls and comprised of a fixed portion and a movable portion;
means pivotally connecting the movable portions of said side wall to the fixed portion thereof whereby said movable portion is pivotable about an axis;
a vaulted bottom structure;
a conduit in said vaulted bottom structure communicating through said walls with the exterior of said preheater;
a plurality of passages in said vaulted bottom structure communicating said conduit with the interior of said preheater;

a closure for said preheater adapted for opening whereby scrap metal can be loaded into said preheater;

means to introduce heat into said preheater at substantially the level of scrap metal in said preheater;

means to exhaust said heat from said preheater via said passages and conduit after said heat has permeated said load of scrap and heated it further; and means to pivot the movable side wall portions and discharge the heated scrap metal from said preheater.

References Cited

UNITED STATES PATENTS

| | | | |
|---|---|---|---|
| 1,414,870 | 5/1922 | Fisher | 214—35 X |
| 1,869,571 | 8/1932 | Lenz | 266—27 |
| 2,493,219 | 1/1950 | Bergstrom | 214—35 X |
| 3,336,020 | 8/1967 | Palsak | 214—35 X |

J. SPENCER OVERHOLSER, Primary Examiner

J. S. BROWN, Assistant Examiner